(12) United States Patent
Uramachi et al.

(10) Patent No.: US 6,513,375 B2
(45) Date of Patent: Feb. 4, 2003

(54) FLOW RATE SENSOR

(75) Inventors: Hiroyuki Uramachi, Tokyo (JP); Fumiyoshi Yonezawa, Tokyo (JP); Tomoya Yamakawa, Tokyo (JP)

(73) Assignee: Mitsubishi Denki Kabushili Kaisha, Tokyo (JP)

( * ) Notice: Subject to any disclaimer, the term of this patent is extended or adjusted under 35 U.S.C. 154(b) by 0 days.

(21) Appl. No.: 09/991,907

(22) Filed: Nov. 26, 2001

(65) Prior Publication Data

US 2002/0029629 A1 Mar. 14, 2002

Related U.S. Application Data

(62) Division of application No. 09/456,012, filed on Dec. 7, 1999.

(30) Foreign Application Priority Data

Jun. 8, 1999 (JP) .......................................... 11-161202

(51) Int. Cl.[7] .................................................. G01F 1/68
(52) U.S. Cl. .................................. 73/204.22; 73/202.5
(58) Field of Search ................................ 73/202, 202.5, 73/204.22

(56) References Cited

U.S. PATENT DOCUMENTS

| | | | |
|---|---|---|---|
| 4,864,855 A | 9/1989 | Shiraishi et al. | ......... 73/204.21 |
| 4,920,808 A | * 5/1990 | Sommer | .................. 73/202.5 |
| 5,329,812 A | 7/1994 | Tada et al. | ............... 73/204.21 |
| 5,339,688 A | * 8/1994 | Johansson et al. | ....... 73/204.22 |
| 5,672,822 A | * 9/1997 | Sawada et al. | ............ 73/202.5 |
| 5,804,718 A | * 9/1998 | Nagasaka et al. | ............. 73/202 |

FOREIGN PATENT DOCUMENTS

| | | | |
|---|---|---|---|
| JP | 8-219838 | 8/1996 | ............. G01F/1/68 |
| JP | 8-297040 | 11/1996 | ............. G01F/1/68 |
| JP | 8-313318 | 11/1996 | ............. G01F/1/68 |
| JP | 10-142020 | 5/1998 | ............. G01F/1/68 |
| JP | 10-332453 | 12/1998 | ............. G01F/1/68 |

* cited by examiner

Primary Examiner—Harshad Patel
(74) Attorney, Agent, or Firm—Sughrue Mion, PLLC

(57) ABSTRACT

In a flow rate sensor, a sensing passage, into which a fluid is introduced and in which a flow rate sensing element is disposed, a support member for supporting the sensing passage, and a circuit case, in which an electronic circuit unit for controlling the flow rate sensing element is accommodated, are formed integrally with each other, and the support member extends into a main passage through a hole opened to the main passage so as to position the sensing passage in the main passage. A structural member, the outside shape of which is formed to have a fluid resistance approximately similar to that of the portion of the support member extending from the hole, is disposed at a position approximately symmetrical with the portion of the support member extending from the hole about the sensing passage.

3 Claims, 14 Drawing Sheets

FLOW RATE SENSOR

This is a divisional of application Ser. No. 09/456,012 filed Dec. 7, 1999, the disclosure of which is incorporated herein by reference.

BACKGROUND OF THE INVENTION

1. Field of the Invention

The present invention relates to a flow rate measuring device for outputting a signal in response to a flow rate, and more specifically to an air flow rate measuring device suitable for measuring, for example, the intake air amount in an internal combustion engine.

2. Description of the Related Art

FIG. 24 and FIG. 25 are a front elevational view and a longitudinal sectional view showing a conventional thermo-sensitive type flow rate sensor disclosed in Japanese Unexamined Patent Publication No. 8-313318, respectively.

In FIG. 24 and FIG. 25, a flow rate sensor 1 comprises a main passage 5 through which a fluid to be measured flows, a sensing passage 6 disposed in the main passage 5 substantially coaxially therewith, a flow rate sensing element 12A disposed in the sensing passage 6, a temperature compensating resistor 13 disposed in the vicinity of the inlet of the sensing passage 6 in the main passage 5 and an air flow regulating grid 7 disposed in the vicinity of the inlet in the main passage 5. Then, a circuit board 8 electrically connected to the flow rate sensing element 12A and the temperature compensating resistor 13 is accommodated in a circuit case 9. Further, a connector 10 for supplying power to the flow rate sensor 1 and taking out a flow rate sensing signal to the outside is disposed on the circuit case 9.

The flow rate sensing element 12A includes a ceramic substrate and a flow rate sensing resistor 11 which is composed of a comb-shaped platinum film formed on the ceramic substrate. Similarly, the temperature compensating resistor 13 is composed of a comb-shaped platinum film formed on the ceramic substrate.

In the conventional flow rate sensor 1 arranged as described above, a heating current flowing to the flow rate sensing resistor 11 of the flow rate sensing element 12A is controlled by a circuit formed in the circuit board 8 so that the average temperature of the flow rate sensing resistor 11 is made higher than the temperature of the fluid to be measured, which is sensed by the temperature compensating resistor 13, by a predetermined temperature. Then, the flow rate of the fluid to be measured can be sensed by measuring the heating current supplied to flow rate sensing resistor 11 and converting the heating current into a flow rate signal by making use of the cooling effect of the flow rate sensing resistor 11 cooled by the fluid to be measured and of the characteristics that the resistance value of the flow rate sensing resistor 11 is varied by temperature.

FIG. 26 shows the piping of an intake air system when the flow rate sensor 1 is generally used as an intake air flow rate sensor of an internal combustion engine for automobile. In many cases, the flow rate sensor 1 is disposed downstream of an air cleaner element 2 accommodated in an air cleaner case 3. The air cleaner element 2 is a filter composed of non-woven fabric, filter paper or the like and is disposed to capture dusts in air drawn by the internal combustion engine and to prevent them from entering the interior thereof. Dusts deposit on the air cleaner element 2 as an automobile travels and it is clogged therewith. Accordingly, differentia of the flow of the intake air having passed through the air cleaner element 2 is remarkable as compared with that of the flow thereof before the air cleaner element 2 is clogged, and thus the distribution of flow velocity of the intake air upstream of the flow rate sensor 1 greatly varies.

Since the flow rate sensing element 12A of the flow rate sensor 1 obtains flow information by sensing the flow velocity of air in a very small portion of the main passage 5, when the distribution of flow velocity of air upstream of the flow rate sensor 1 varies, an error arises in a flow rate sensing signal even if the flow velocity does not vary.

Incidentally, as the size of an engine room is reduced recently, there is an increasing need for the reduction in size of the flow rate sensor. To satisfy this need, proposed is a flow rate sensor of a so-called plug-in structure which does not include an air flow piping section (main passage 5) as disclosed in, for example, Japanese Unexamined Patent Publication No. 8-219838. However, since the flow rate sensor of the plug-in structure is not provided with the air flow piping section, it is difficult for the flow rate sensor to regulate an air flow using the air flow regulator (air flow regulating grid 7) as described above. Therefore, when the flow rate sensor of the plug-in structure is used as an intake air flow rate sensor of an internal combustion engine for automobile, an error is liable to arise in a flow rate sensing signal at the time the air cleaner element 2 is clogged.

Further, it is contemplated to mount an air flow regulator on an air cleaner case or an intake air pipe to improve the sensing accuracy of the flow rate sensor of the plug-in structure. In this case, the pitch of the air flow regulating elements of the air flow regulator must be made fine to obtain a sufficient air flow regulating effect. Making the pitch of the air flow regulating elements fine results in an increase of a pressure loss. Thus, there arises a problem that the amount of air which can be drawn by the internal combustion engine is reduced and the output thereof is lowered. Further, when the pitch of the air flow regulating elements is too fine, a problem arises in that they are clogged with small dusts having passed through an air cleaner element. In contrast, when the pitch of the air flow regulating elements is made coarse, not only an air flow regulating effect is lowered but also the thickness of a boundary layer and the frictional stress in a flow rate sensing unit are made uneven by eddies generated downstream and upstream of the air flow regulator. Accordingly, there arises a problem that a flow cannot be correctly measured because a flow rate sensing signal is disturbed.

Further, there is a problem that a manufacturing cost is increased because an air regulating structural member is provided in addition to the flow rate sensor.

A recent thermo-sensing type flow rate sensor employs a flow rate sensing element which is miniaturized to provide a prompt response. In this case, when an air flow regulator is disposed upstream of a flow rate sensing element, there is a problem that the flow rate sensing element is liable to be affected by the fluidic disturbance generated by the air flow regulator and a flow rate sensing accuracy is deteriorated by the further increase of a noise component included in a flow rate sensing signal.

In addition, the flow rate sensor of the plug-in structure is inserted into a hole opened to a main passage as shown in, for example, FIG. 1 and FiG. 2 of Japanese Unexamined Patent Publication No. 8-219838 and the sensing passage thereof is located approximately at the center of the cross section of the main passage. When the flow rate sensor is viewed from an upstream side, a support member is interposed between the sensing passage and the main passage to support the sensing passage. Accordingly, differentia of a flow resistance is caused in an up/down direction (the direction in which the support member extends from the inner wall surface of the main passage) about the sensing passage. Further, a flow rate sensor using a plate-shaped air flow regulating member disposed below a sensing passage is disclosed in Japanese Unexamined Patent Publication No. 10-332453. Differentia of a fluid resistance is caused in an upper and lower direction about the sensing passage also in this case. In the flow rate sensor arranged as described above, when a distribution of flow velocity varies upstream of the flow rate sensor, the flow velocity is made uneven in the up/down direction of the flow rate sensor and an error arises in a flow rate sensing signal.

A flow rate sensor arranged integrally with a fluid temperature sensing element using a thermistor or the like is disclosed in, for example, Japanese Unexamined Patent Publication No. 8-297040. When the flow rate sensor is viewed from an upstream side, the thermistor is mounted by being dislocated in a right or left side about a support member for supporting a sensing passage. In this case, since differentia of a fluid resistance is caused in the right to left direction about the support member, when a distribution of flow velocity varies upstream of the flow rate sensor, an error is liable to arise in a sensed flow.

The flow rate sensor, which uses the thermistor as the fluid temperature sensing element, is provided with a protector to prevent the damage of the thermistor when the flow rate sensor is inserted into an air flow piping section as disclosed in Japanese Unexamined Patent Publication No. 8-297040. However, there is a possibility that the thermistor is damaged when it is inserted into a hole formed at a sensing passage in the assembly of the flow rate sensor, and this is not taken into consideration.

Further, when a film-shaped flow rate sensing element is used as shown in Japanese Unexamined Patent Publication No. 10-142020, the flow rate sensing element is assembled so that it is substantially in parallel with the axial direction of a flow rate sensor (the axial direction of a sensing passage) as well as the surface thereof is substantially flush with a plate-shaped member extending into a sensing passage, and an end thereof is buried in a support member and fixed therein. Then, the flow rate sensing element is in electrical conduct to a control circuit section by a method of wire bonding or the like. Further, the flow rate sensing element is disposed substantially at the center of the cross section of the sensing passage where a distribution of flow velocity is made uniform. When it is intended to perform a response from the flow rate sensor at a high speed, the miniaturization of the flow rate sensing element is effective for the purpose. However, the flow rate sensing element is miniaturized, a protective member for protecting the electric junction at which the flow rate sensing element is electrically connected to the control circuit section must be exposed to the sensing passage to dispose the flow rate sensing element at the center of the sensing passage. In this case, when the sensing passage is viewed from an upstream side, differetia of a flow resistance, which is uneven in an up/down direction, is caused by the protective member. Therefore, when the distribution of flow velocity varies upstream of the flow rate sensor, an error arises in a sensed flow.

SUMMARY OF THE INVENTION

An object of the present invention, which was made to solve the above problems, is to obtain a flow rate sensor which can correctly sense a flow even if a distribution of flow velocity varies upstream of the flow rate sensor, has a small pressure loss and is less expensive including a manufacturing cost.

In order to achieve the above object, according to one aspect of the present invention, there is provided a flow rate sensor comprising a flow rate sensing element for sensing the flow rate of a fluid, a sensing passage into which the fluid is introduced and in which the flow rate sensing element is disposed, a support member for supporting the sensing passage and a circuit case in which an electronic circuit unit for controlling the flow rate sensing element is accommodated, wherein the sensing passage, the support member and the circuit case are formed integrally with each other and the support member extends into a main passage, through which the fluid flows, through a hole opened to the main passage so as to position the sensing passage in the main passage. The flow rate sensor further comprises a structural member whose the outside shape is formed to have a fluid resistance approximately similar to that of the portion of the support member extending from the hole, wherein the structural member is disposed at a position approximately symmetrical with the portion of the support member extending from the hole about the sensing passage.

According to another aspect of the present invention, there is provided a flow rate sensor comprising a flow rate sensing element for sensing the flow rate of a fluid, a sensing passage into which the fluid is introduced and in which the flow rate sensing element is disposed, a support member for supporting the sensing passage, a circuit case in which an electronic circuit unit for controlling the flow rate sensing element is accommodated and a fluid temperature sensing element for sensing the temperature of the fluid, wherein the sensing passage, the support member and the circuit case is formed integrally with each other and the support member extends into a main passage, through which the fluid flows, through a hole opened to the main passage so as to position the sensing passage and the fluid temperature sensing element in the main passage. The flow rate sensor further comprises a protector for protecting the fluid temperature sensing element, and a structural member whose the outside shape is formed to have a fluid resistance approximately similar to that of the protector, wherein the protector and the structural member are disposed at positions approximately symmetrical with respect to the support member for supporting the sensing passage.

According to still another aspect of the present invention, there is provided a flow rate sensor comprising a flow rate sensing element for sensing the flow rate of a fluid, a sensing passage into which the fluid is introduced and in which the flow rate sensing element is disposed, a support member for supporting the sensing passage, a sensing assistant member disposed so as to extend into the sensing passage for supporting the flow rate sensing element and a circuit case in which an electronic circuit unit for controlling the flow rate sensing element is accommodated. The flow rate sensor further comprises a protective member disposed so as to project into the sensing passage for protecting an electric junction, at which the electronic circuit unit is connected to the flow rate sensing element, from the fluid in cooperation with the sensing assistant member, and a structural member the outside shape of which is formed to have a fluid resistance approximately similar to that of the portion of the protective member projecting into the sensing passage, the structural member being located at a position approximately symmetrical with the portion of the protective member projecting into the sensing passage about the axial center of the sensing passage.

DESCRIPTION OF THE PREFERRED EMBODIMENTS

Embodiments of the present invention will be described below.

Embodiment 1

Figure 1:
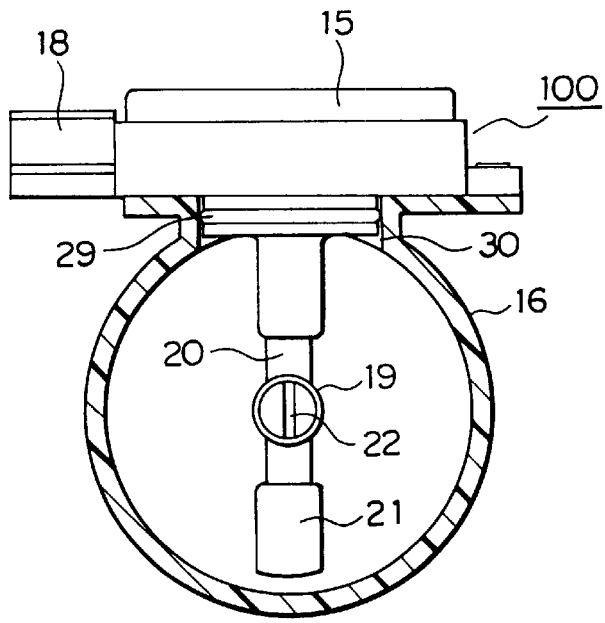
FIG. 1 is a partial lateral sectional view showing a flow rate sensor according to an embodiment 1 of the present invention.
Figure 2:
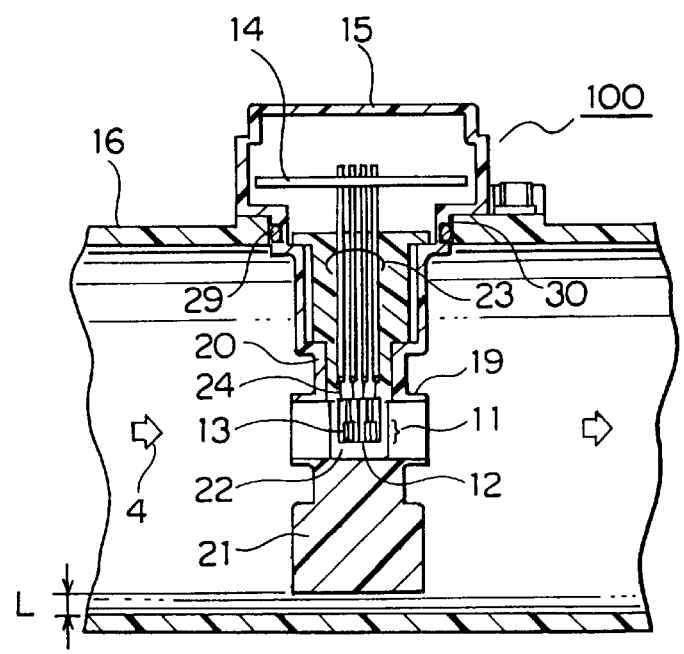
FIG. 2 is a longitudinal sectional view showing the flow rate sensor according to the embodiment 1 of the present invention.

FIG. 1 and FIG. 2 are a partial lateral sectional view and a longitudinal sectional view showing a flow rate sensor according to an embodiment 1 of the present invention, respectively.

In FIG. 1 and FIG. 2, a main passage 16 is a cylindrical tube made of a resin through which a fluid to be measured flows. The main passage 16 is formed integrally with, for example, an air cleaner case disposed to the piping of the intake air system of an internal combustion engine for automobile. A flow rate sensor 100 is formed as a so-called plug-in structure which is mounted to the main passage 16 so as to sense the flow rate of a fluid flowing therein. The flow rate sensor 100 comprises a support member 20, a cylindrical sensing passage 19, a plate-shaped sensing assistant member 22, a flow rate sensing element 12, a structural member 21 and a circuit case 15. The sensing passage 19 is disposed at an end of the support member 20 so that the axial center direction thereof is perpendicular to the lengthwise direction of the support member 20; the sensing assistant member 22 extends from the inner wall surface of the sensing passage 19 in the lengthwise direction of the support member 20 so that the main surface thereof passes through the axial center of the sensing passage 19; the flow rate sensing element 12 is assembled to the sensing assistant member 22 so that the surface thereof is flush with the sensing assistant member 22 with an end thereof fixed in the support member 20; the structural member 21 extends from the outer wall surface of the sensing passage 19 in the lengthwise direction of the support member 20 so as to be located at a position symmetrical with the support member 20 with respect to the sensing passage 19; and the circuit case 15 is disposed to the other end of the support member 20. The sensing passage 19, the support member 20 and the circuit case 15 are molded of a resin integrally with each other. That is, they are formed as an integral resin body.

The flow rate sensor 100 is inserted into the main passage 16 through an opening 30 formed thereat so that the support member 20 extends from the inner wall surface of the main passage 16 thereinto. Then, the flow rate sensor 100 is mounted on the main passage 16 by tightening and fixing the circuit case 15 to the outer wall thereof by screws (not shown). At the time, an O-ring 29 is interposed between the support member 20 and the opening 30 of the main passage 16, thereby securing the air tightness of the main passage 16. The sensing passage 19 is disposed in the main passage 16 approximately coaxially therewith. Further, the axial center direction of the sensing passage 19 is approximately in agreement with the flow direction 4 of the fluid to be measured. Further, the structural member 21 is formed to a shape similar to that of a portion of the section, which projects into the main passage 16, of the support member 20.

A circuit board 14 as an electronic circuit unit is accommodated in the circuit case 15 to control an electric signal. Then, terminals 23 connected to the circuit board 14 are electrically connected to the flow rate sensing element 12 through leads 24 in the support member 20. Further, a connector 18 is disposed to the circuit case 15 so that power can be supplied from the outside to the flow rate sensor 100 and a flow signal sensed by the flow rate sensor 100 can be taken out to the outside.

The flow rate sensing element 12 is composed of a comb-shaped flow rate sensing resistor 11 and a temperature compensating resistor 13 formed on a silicon substrate compositely by patterning a platinum film deposited on the silicon substrate. A heat insulating means (not shown) is disposed to prevent the heat conduction from the flow rate sensing resistor 11 to the temperature compensating resistor 13.

In the following description, the lengthwise direction of the support member 20, that is, the direction in which the support member 20 extends from the inner wall surface of the main passage 16 is defined as an up/down direction, and the direction perpendicular to the axial center of the sensing passage 19 and to the lengthwise direction of the support member 20 is defined as a right to left direction. This definition is also applied to the embodiments which will be described hereafter. To obtain the effect of the present invention, the temperature compensating resistor 13 is not necessarily formed on the flow rate sensing element 12 and only the flow rate sensing resistor 11 may be formed to the flow rate sensing element 12. Further, the substrate of the flow rate sensing element 12 is not limited to the silicon substrate and any substrate may be used so long as it is an electric insulator, and the substrate may be, for example, a ceramic substrate. Further, the material of the flow rate sensing resistor 11 and the temperature compensating resistor 13 is not limited to platinum and may be any material so long as it is a thermo-sensitive resistance material, and it may be, for example, nickel, permalloy and the like.

In the flow rate sensor 100 arranged as described above, since the structural member 21 is formed to the shape similar to that of a portion of the section, which projects into the main passage 16, of the support member 20, a portion of the support member 20 in the main passage 16 and the structural member 21 have the same fluid resistance. Further, since the structural member 21 and the support member 20 are disposed symmetrically about the sensing passage 19, the fluid resistance is made uniform in the up/down direction.

Thus, even if differentia of the distribution of flow velocity of the fluid to be measured, which flows into the main passage 16, is caused, the component of flow velocity in a main flow axis direction is corrected at least in the up/down direction and the distribution of flow velocity of the fluid to be measured is averaged in the main flow axis direction. As a result, an error is difficult to arise in a sensed flow and a flow rate can be correctly sensed.

Note that while the structural member 21 is formed to the shape similar to that of a portion of the section, which projects into the main passage 16, of the support member 20 in the embodiment 1, it is not necessarily formed to the similar shape and it is sufficient for them to have substantially the same flow resistance.

Further, a distance L is put between the structural member 21 and the inner wall surface of the main passage 16 in the embodiment 1, and it is preferable that distance L is set to one half or less the inside radius r of the main passage 16 because a fluid resistance is made by the friction stress of the wall surface in the vicinity of the inner wall surface of the main passage 16.

Embodiment 2

Figure 3:
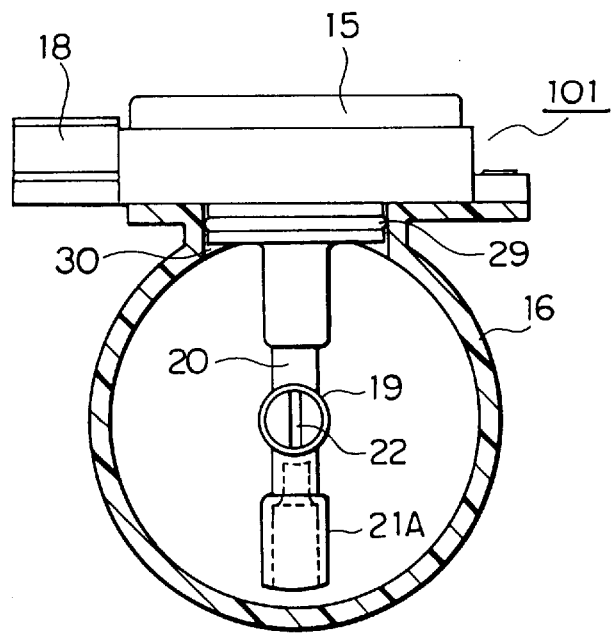
FIG. 3 is a partial lateral sectional view showing a flow rate sensor according to an embodiment 2 of the present invention.
Figure 4:
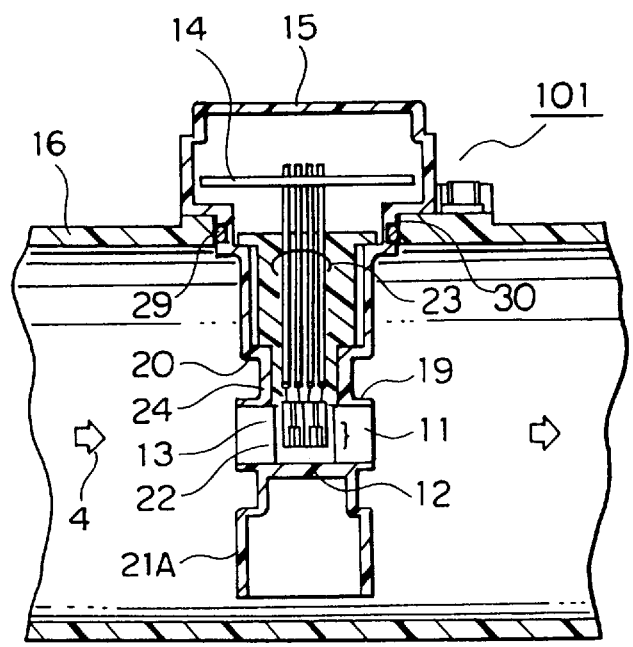
FIG. 4 is a longitudinal sectional view showing the flow rate sensor according to the embodiment 2 of the present invention.

FIG. 3 and FIG. 4 are a partial lateral sectional view and a longitudinal sectional view showing a flow rate sensor according to an embodiment 2 of the present invention, respectively.

As shown in FIG. 3 and FIG. 4, in the embodiment 2, a structural member 21A is disposed in a sensing passage 19 at a position approximately symmetrical with a support member 20 about the sensing passage 19. The structural member 21A is molded of, for example, a resin or the like integrally with the sensing passage 19 and has a fluid resistance substantially approximately similar to that of the portion of a support member 20 projecting into a main passage 16. Further, the structural member 21A is formed by extracting a predetermined solid portion from the interior thereof.

Note that the other arrangement of the embodiment 2 is similar to that of the embodiment 1.

In the flow rate sensor 101 arranged as described above, since the amount of the resin necessary to form the structural member 21A can be reduced, the flow rate sensor of light weight can be obtained at a less expensive cost, in addition to the effect of the embodiment 1.

Further, since the moment of the sensing passage 19 including the structural member 21A is reduced, the strength of the support member 20 of the sensing passage 19 can be lowered and thus the width of the support member 20 can be narrowed, whereby a pressure loss can be reduced.

Embodiment 3

Figure 5:
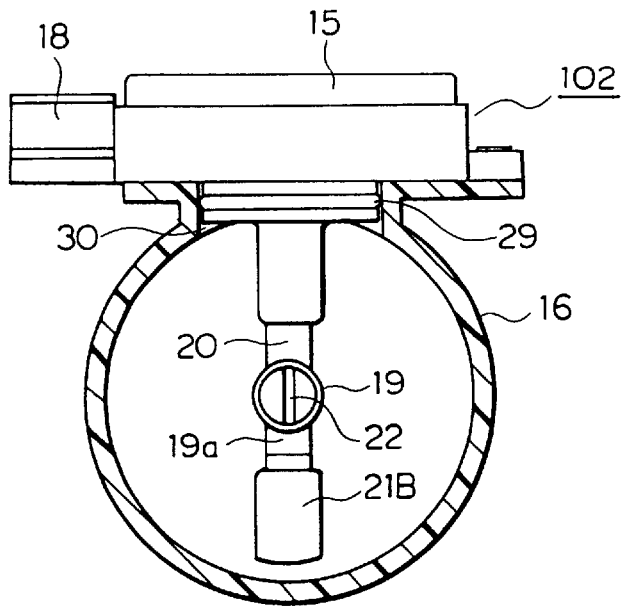
FIG. 5 is a partial lateral sectional view showing a flow rate sensor according to an embodiment 3 of the present invention.
Figure 6:
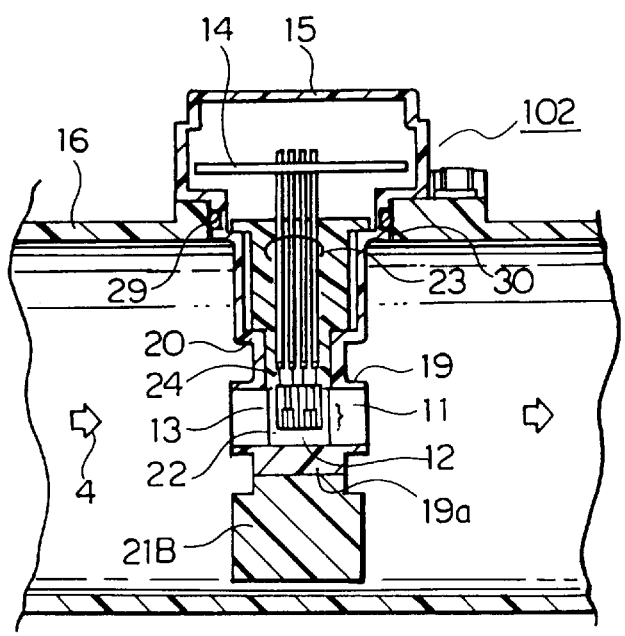
FIG. 6 is a longitudinal sectional view showing the flow rate sensor according to the embodiment 3 of the present invention.

FIG. 5 and FIG. 6 are a partial lateral sectional view and a longitudinal sectional view showing a flow rate sensor according to an embodiment 3 of the present invention, respectively.

As shown in FIG. 5 and FIG. 6, in the embodiment 3, a mounting section 19a is disposed to the outer peripheral wall of a sensing passage 19 in a projecting state at a position symmetrical with a support member 20, and further a structural member 21B is fixed to the mounting section 19a by soldering. Then, the portion composed of the mounting section 19a and the structural member 21B and projecting from the sensing passage 19 is formed to an outside shape whose flow resistance is substantially approximately similar to that of the portion of the support member 20 projecting into a main passage 16. Further, the structural member 21B and the support member 20 have a symmetrical positional relationship about the sensing passage 19.

Note that the other arrangement of the embodiment 3 is similar to that of the embodiment 1.

When this type of the flow rate sensor is standardized as an intake air flow rate sensor for an internal combustion engine for automobile having several kinds of displacement amounts and applied thereto, the main passage 16 to which the flow rate sensor is mounted has several kinds of inside diameters in accordance with the displacements and outputs of the internal combustion engine.

In the flow rate sensor 102 arranged as described above, the sensing passage 19 and the structural member 21B are formed as separate members. Thus, when several kinds of the structural members 21B having various lengths in a diametrical direction are prepared, a structural member 21B having a suitable length can be selected and combined in accordance with the inside diameter of a main passage 16 to which it is applied. As a result, the structural components of the flow rate sensor 102 other than the structural member 21B can be standardized. According to the embodiment 3, the flow rate sensor of low cost can be obtained, in addition to the effect of the embodiment 1.

Note that while the structural member 21B is soldered to the mounting section 19a of the sensing passage 19 in the embodiment 3, a method of fixing the sensing passage 19 to the structural member 21B is not limited to the soldering, and the structural member 21B may be fixed to the mounting section 19a by bonding or through screws.

In the embodiment 3, while the structural member 21B is fixed to the mounting section 19a disposed to the sensing passage 19, the structural member 21B may be directly fixed to the sensing passage 19.

Figure 7:
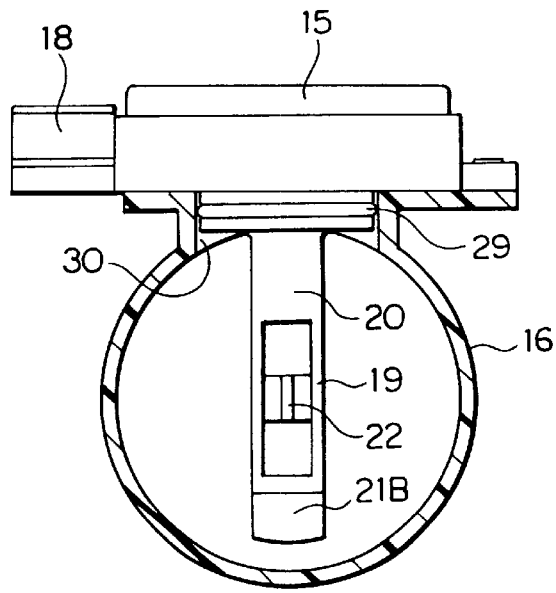
FIG. 7 is a partial lateral sectional view showing another embodiment of the flow rate sensor according to the embodiment 3 of the present invention.
Figure 8:
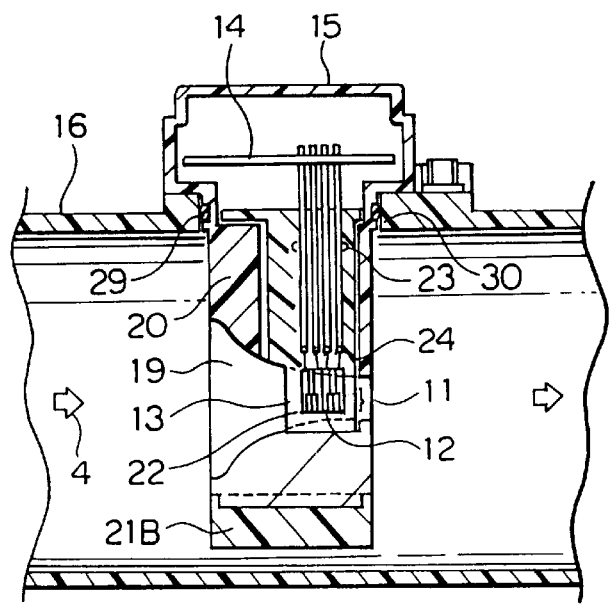
FIG. 8 is a longitudinal sectional view showing the another embodiment of the flow rate sensor according to the embodiment 3 of the present invention.

Further, while the sensing passage 19 is formed to a cylindrical shape in the embodiment 3, the shape thereof is not limited to the cylindrical shape and may be formed to, for example, a rectangular shape as shown in FIG. 7 and FIG. 8 and further may be formed to an elliptic cylindrical shape.

Embodiment 4

Figure 9:
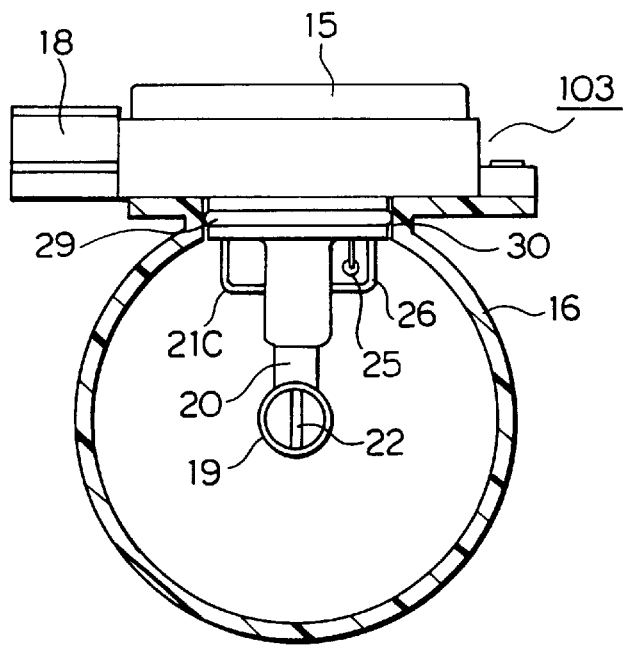
FIG. 9 is a partial lateral sectional view showing a flow rate sensor according to an embodiment 4 of the present invention.
Figure 10:
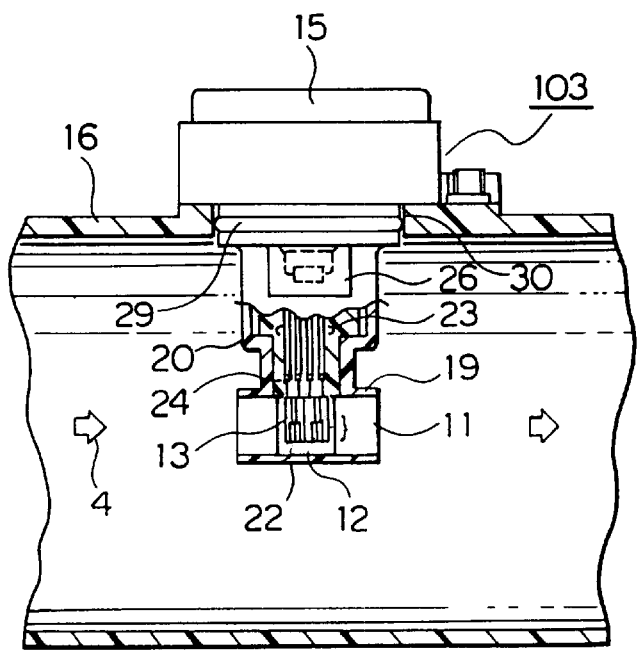
FIG. 10 is a partial longitudinal sectional view showing the flow rate sensor according to the embodiment 4 of the present invention.

FIG. 9 and FIG. 10 are a partial lateral sectional view and a longitudinal sectional view showing a flow rate sensor according to an embodiment 4 of the present invention, respectively.

As shown in FIG. 9 and FIG. 10, in the embodiment 4, a thermistor 25 as a fluid temperature sensing element is disposed to a circuit case 15 so as to be exposed in a main passage 16. A protector 26 is disposed to a support member 20 to protect the thermistor 25. Further, a structural member 21C having a shape similar to that of the protector 26 is disposed at a position approximately symmetrical with the protector 26 about the support member 20 of a sensing passage 19.

Note that the other arrangement of the embodiment 4 is similar to that of the embodiment 1.

In the flow rate sensor 103 arranged as described above, since the protector 26 and the structural member 21C have approximately the same fluid resistance as well as they are disposed symmetrically about the sensing passage 19, a fluid resistance is made uniform on the right and left sides of the sensing passage 19.

Thus, even if differentia of the distribution of flow velocity of the fluid to be measured, which flows into the main passage 16, is caused, the component of flow velocity in a main flow axis direction is corrected at least in a right to left direction and the distribution of flow velocity of the fluid to be measured is averaged in the main flow axis direction because the fluid resistance is made uniform on the right and left sides of the sensing passage 19. Therefore, an error is difficult to arise in a sensed flow and a flow rate can be correctly sensed.

Embodiment 5

Figure 11:
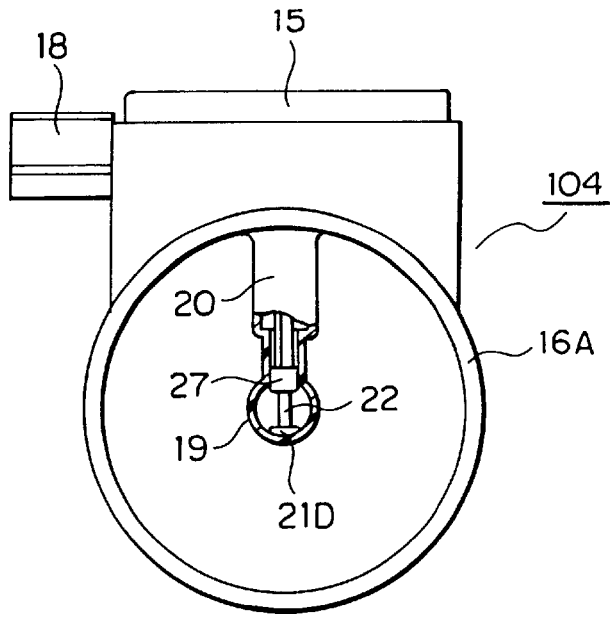
FIG. 11 is a partial lateral sectional view showing a flow rate sensor according to an embodiment 5 of the present invention.
Figure 12:
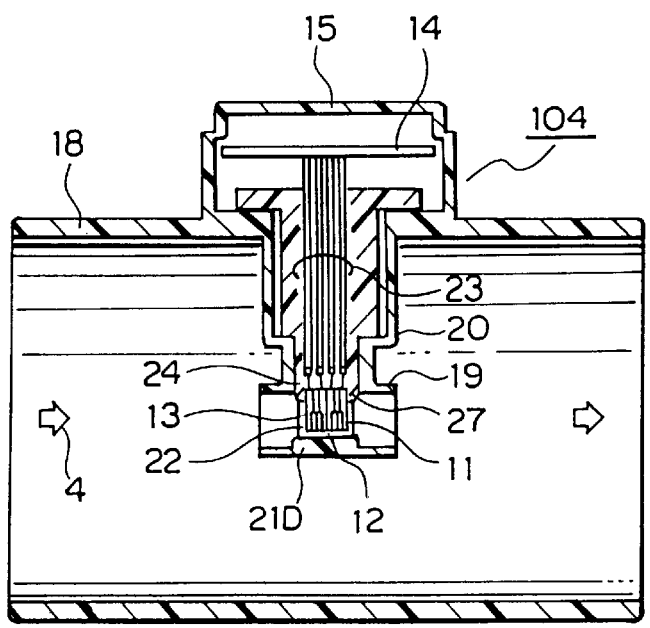
FIG. 12 is a longitudinal sectional view showing the flow rate sensor according to the embodiment 5 of the present invention.

FIG. 11 and FIG. 12 are a partial lateral sectional view and a longitudinal sectional view showing a flow rate sensor according to an embodiment 5 of the present invention, respectively.

In FIG. 11 and FIG. 12, the flow rate sensor 104 comprises a cylindrical main passage 16A which is made of a resin and through which a fluid to be measured flows, a cylindrical sensing passage 19, a support member 20, a plate-shaped sensing assistant member 22, a flow rate sensing element 12 and a circuit case 15. The sensing passage 19 is disposed in the main passage 16A approximately coaxially therewith; the support member 20 extends from the inner wall surface of the main passage 16A and supports the sensing passage 19; the sensing assistant member 22 extends from the inner wall surface of the sensing passage 19 in the direction in which the support member 20 extends so that the main surface thereof passes through the axial center of the sensing passage 19; the flow rate sensing element 12 is assembled to the sensing assistant member 22 so that the surface thereof is flush with the sensing assistant member 22 with an end thereof fixed in the support member 20; and the circuit case 15 is disposed to the outer wall surface of the main passage 16A.

Terminals 23 are electrically connected to the flow rate sensing element 12 through leads 24 in the support member 20. A flow rate sensing resistor 11 formed to the miniaturized flow rate sensing element 12 is disposed so as to be located approximately at the center of the sensing passage 19. Further, the electric junctions where the terminals 23 are connected to the leads 24 and the leads 24 are connected to the flow rate sensing resistor 11 are protected from the fluid to be measured by a protective member 27 which is formed integrally with the sensing assistant member 22. The protective member 27 is disposed such that a portion thereof is exposed in the sensing passage 19. Further, a structural member 21D, which has a shape approximately similar to that of the portion of the protective member 27 exposed in the sensing passage 19, is disposed on the inner wall surface of the sensing passage 19 at a position approximately symmetrical with the exposed portion of the protective member 27 about the axial center of the sensing passage 19.

Note that the protective member 27 need not be formed integrally with the sensing assistant member 22 to obtain the effect of the present invention and it may be formed separately therefrom. This is also applicable to the embodiments described below.

Miniaturization of the flow rate sensing element 12 is effective to obtain a high speed response from the flow rate sensor. However, when the miniaturization of the flow rate sensing element 12 is promoted, the protective member 27 for protecting the lead 24 must be exposed in the sensing passage 19 in order to dispose the flow rate sensing resistor 11, which is formed on the flow rate sensing element 12, approximately at the center of the sensing passage 19 in which a distribution of flow velocity is made uniform. Otherwise, a flow resistance is made uneven in the up/down direction in the sensing passage 19. Thus, when the distribution of flow velocity varies upstream of the flow rate sensor, an error is liable to be arisen in a sensed flow.

According to the embodiment 5, the structural member 21D having the shape, which is approximately similar to that of the portion of the protective member 27 exposed in the sensing passage 19, is disposed on the inner wall surface of the sensing passage 19 at the position approximately symmetrical with the exposed portion of the protective member 27 about the axial center of the sensing passage 19. Accordingly, the fluid resistance is made uniform in the up/down direction of the sensing assistant member 22 of the flow rate sensing element 12. As a result, even if the distribution of flow velocity varies upstream of the flow rate sensor 104, an error is difficult to be arisen in a sensed flow and a flow rate can be correctly sensed because the component of flow velocity in the main flow axis direction is corrected at least in the up/down direction in the sensing passage 19 and the distribution of flow velocity of the fluid to be measured is averaged in the main flow axis direction.

Embodiment 6

Figure 13:
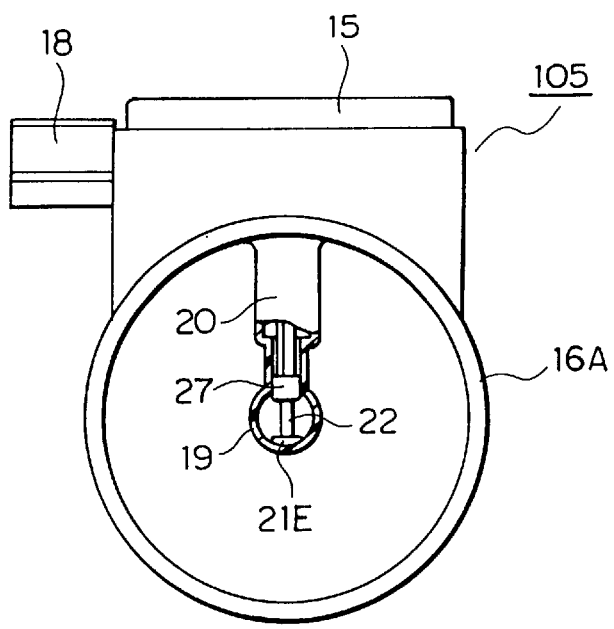
FIG. 13 is a partial lateral sectional view showing a flow rate sensor according to an embodiment 6 of the present invention.
Figure 14:
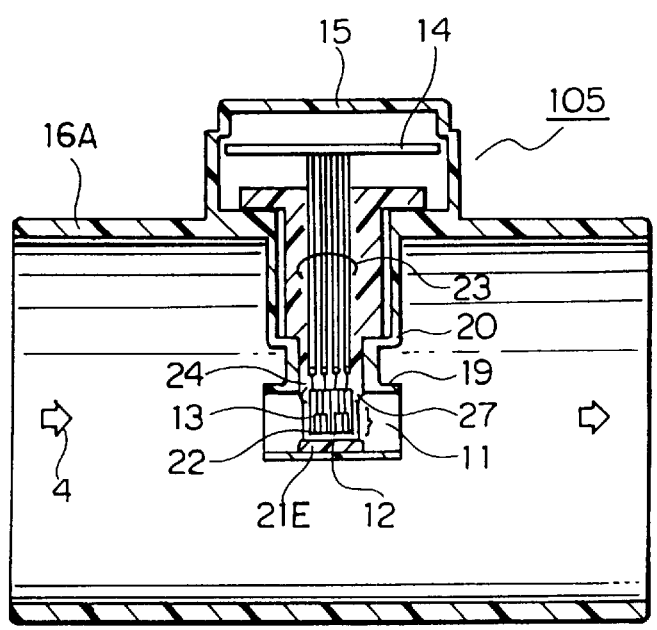
FIG. 14 is a longitudinal sectional view showing the flow rate sensor according to the embodiment 6 of the present invention.

FIG. 13 and FIG. 14 are a partial lateral sectional view and a longitudinal sectional view showing a flow rate sensor according to an embodiment 6 of the present invention, respectively.

As shown in FIG. 13 and FIG. 14, in the embodiment 6, a structural member 21E, which has a fluid resistance approximately similar to that of the portion of a protective member 27 exposed in a sensing passage 19, is made of, for example, a resin or the like and formed integrally with a sensing assistant member 22 which is also made of the resin or the like. The structural member 21E is disposed at a position approximately symmetrical with the exposed portion of the protective member 27 about the axial center of the sensing passage 19.

Note that the other arrangement of the embodiment 6 is similar to that of the embodiment 5.

In the flow rate sensor 105 arranged as described above, since the structural member 21E, which has the fluid resistance approximately similar to that of the portion of the protective member 27 exposed in the sensing passage 19, is made of, for example, the resin or the like and formed integrally with the sensing assistant member 22 which is also made of the resin or the like, it has the following effect, in addition to the effect of the embodiment 5. That is, when the sensing assistant member 22 is assembled to the structural member 21E, their assembled positions are not relatively dislocated as compared with the case that the structural member 21D is formed separately from the sensing assistant member 22 as shown in the embodiment 5 because the positions where they are assembled are not dispersed. Accordingly, the dispersion of the flow characteristics of the flow rate sensor can be reduced.

Embodiment 7

Figure 15:
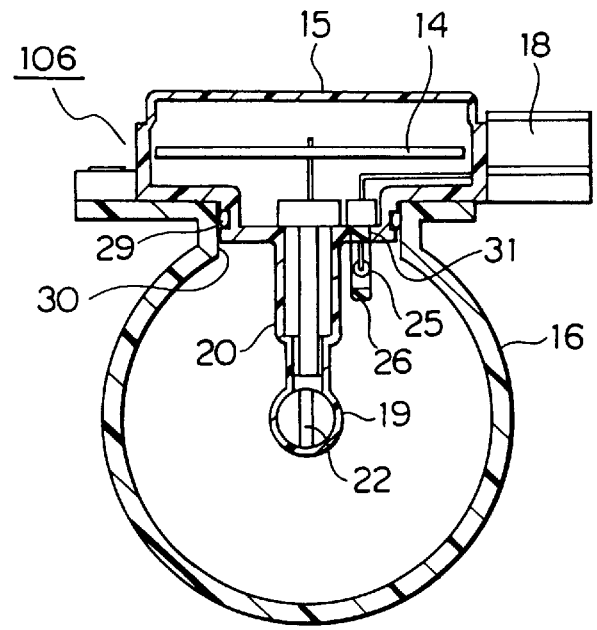
FIG. 15 is a partial lateral sectional view showing a flow rate sensor according to an embodiment 7 of the present invention.
Figure 16:
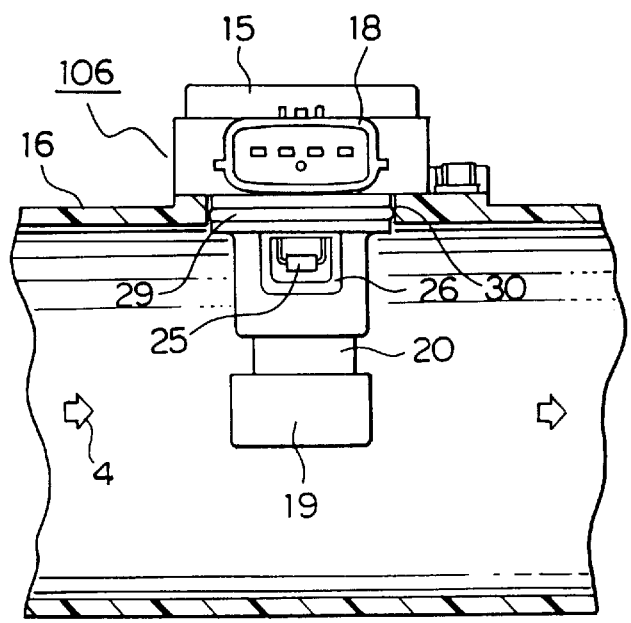
FIG. 16 is a partial longitudinal sectional view showing the flow rate sensor according to the embodiment 7 of the present invention.

FIG. 15 and FIG. 16 are a partial lateral sectional view and a longitudinal sectional view showing a flow rate sensor according to an embodiment 7 of the present invention, respectively.

As shown in FIG. 15 and FIG. 16, in the embodiment 7, a thermistor 25 as a fluid temperature sensing element and a protector 26 are formed as an integral unit. The unit is inserted into a main passage 16 through a hole 31 formed at a circuit case 15 so that the thermistor 25 is exposed therein.

Note that the other arrangement of the embodiment 7 is similar to that of the embodiment 1.

In the flow rate sensor 106 arranged as described above, since the thermistor 25 and the protector 26 are made of, for example, a resin or the like and previously formed integrally with each other, the thermistor 25 does not come into contact or collide with a main passage 16 when the flow rate sensor 106 is assembled to the hole 30 formed to the main passage 16. Further, when the thermistor 25 is inserted into the hole 31 formed at the circuit case 15 in the manufacture of flow rate sensor 106, the thermistor 25 does not come into contact or collide with the circuit case 15. As a result, the yield of the flow rate sensor can be improved in the manufacture thereof and the manufacturing cost thereof can be reduced.

Embodiment 8

Figure 17:
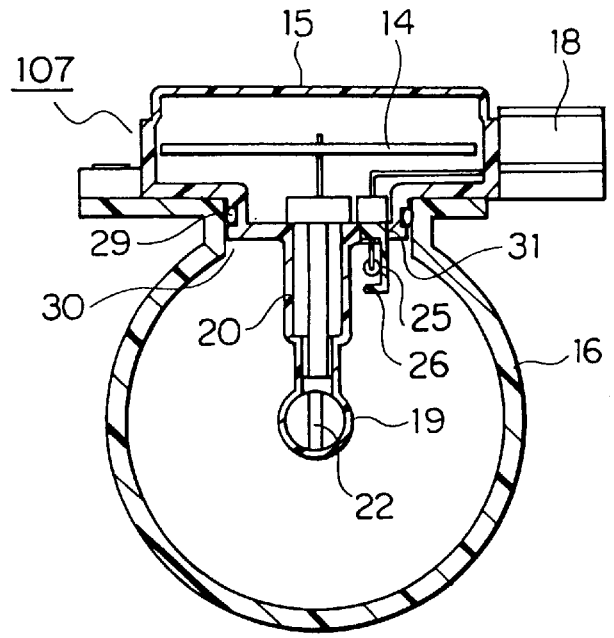
FIG. 17 is a partial lateral sectional view showing a flow rate sensor according to an embodiment 8 of the present invention.
Figure 18:
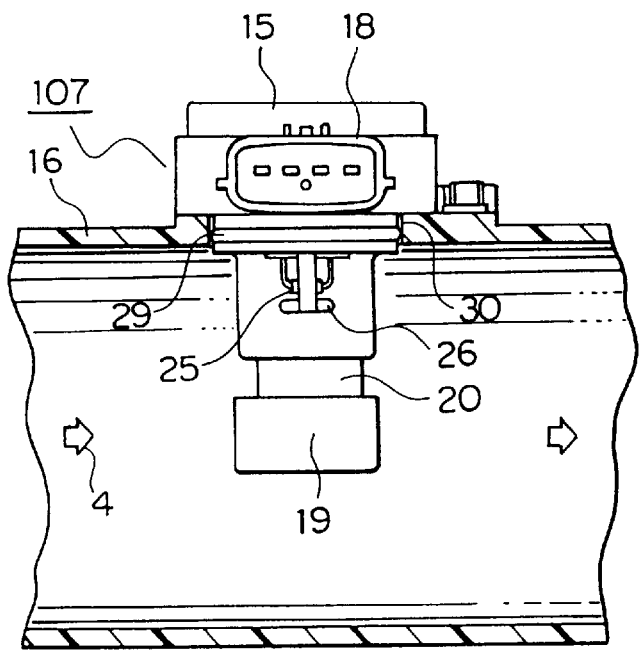
FIG. 18 is a partial longitudinal sectional view showing the flow rate sensor according to the embodiment 8 of the present invention.

FIG. 17 and FIG. 18 are a partial lateral sectional view and a longitudinal sectional view showing a flow rate sensor according to an embodiment 8 of the present invention, respectively.

As shown in FIG. 17 and FIG. 18, in the embodiment 8, a thermistor 25 as a fluid temperature sensing element and a protector 26 are formed as an integral unit. Then, the protector 26 is formed so as to leave the thermistor 25 to view from the upstream side and the downstream side. The unit is inserted into a main passage 16 through a hole 31 formed at a circuit case 15 so that the thermistor 25 is exposed therein.

Note that the other arrangement of the embodiment 8 is similar to that of the embodiment 7.

In the flow rate sensor 107 arranged as described above, since no structural member is disposed upstream of the thermistor 25, the thermistor 25 can be easily in contact with a fluid to be measured and thus the temperature of the fluid can be correctly measured, in addition to the effect of the embodiment 7.

Embodiment 9

Figure 19:
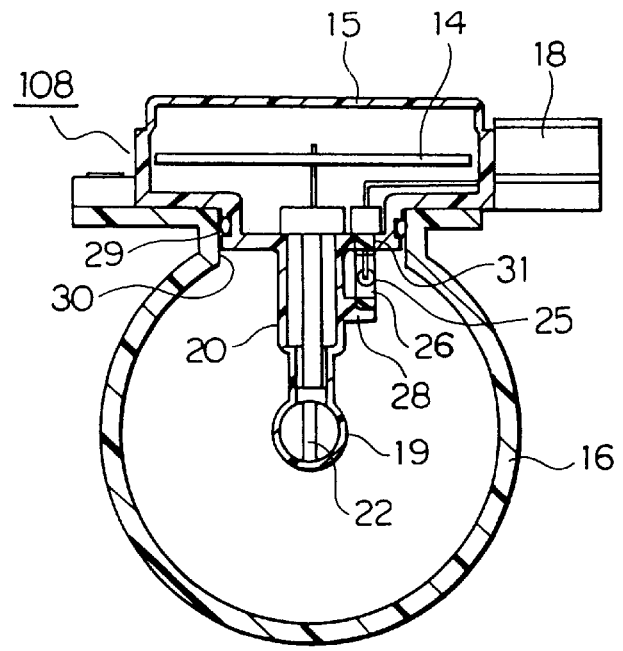
FIG. 19 is a partial lateral sectional view showing a flow rate sensor according to an embodiment 9 of the present invention.
Figure 20:
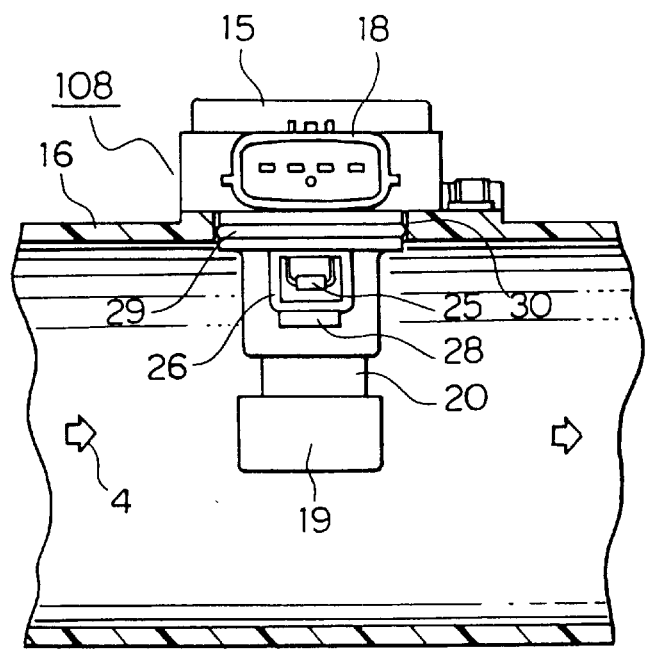
FIG. 20 is a partial longitudinal sectional view showing the flow rate sensor according to the embodiment 9 of the present invention.

FIG. 19 and FIG. 20 are a partial lateral sectional view and a longitudinal sectional view showing a flow rate sensor according to an embodiment 9 of the present invention, respectively.

As shown in FIG. 19 and FIG. 20, in the embodiment 9, a thermistor 25 as a fluid temperature sensing element and a protector 26 are formed as an integral unit. The unit is inserted into a main passage 16 through a hole 31 formed at a circuit case 15 so that the thermistor 25 is exposed therein. Further, a projecting structural body 28 is formed to the support member 20 of a sensing passage 19 integrally therewith so as to be in contact with the protector 26.

Note that the other arrangement of the embodiment 9 is similar to that of the embodiment 7.

In the flow rate sensor 108 arranged as described above, when the thermistor 25, which is formed integrally with the protector 26, is inserted into the main passage 16 through the hole 31 formed at the circuit case 15 and assembled by being spaced apart from the support member 20 of the sensing passage 19 in the manufacture of the flow rate sensor, it is positioned at the two points, that is, at the hole 31 formed at the circuit case 15 and at the structural member 28 and fixed thereat. Accordingly, a flow rate sensor having reliability in strength can be obtained, in addition to the effect of the embodiment 7 because the protector 26 and the thermistor 25 are neither broken nor destroyed by external force when the flow rate sensor is assembled to the main passage 16.

Further, positional dislocation is difficult to be arisen in the assembly of the thermistor 25, and thus the dispersion of the flow characteristics of the flow rate sensor due to the dispersion of the assembled positions of the thermistor 25 can be reduced.

Embodiment 10

Figure 21:
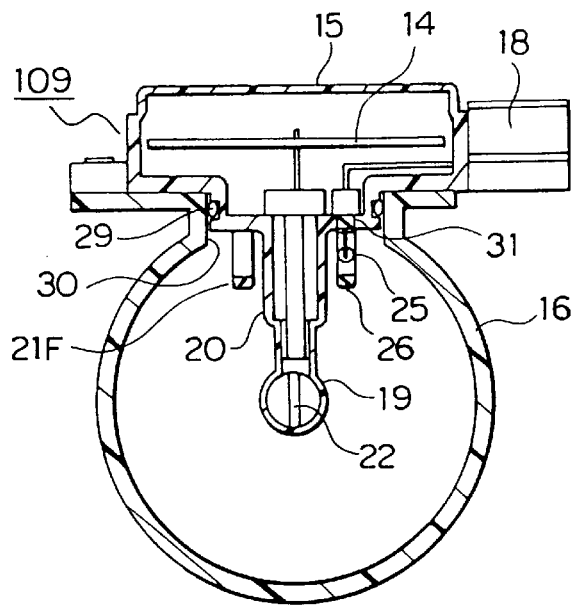
FIG. 21 is a partial lateral sectional view showing a flow rate sensor according to an embodiment 10 of the present invention.

FIG. 21 is a partial lateral sectional view showing a flow rate sensor according to an embodiment 10 of the present invention.

As shown in FIG. 21, in the embodiment 10, a structural member 21F having a shape similar to that of the protector 26 is disposed at a position approximately symmetrical with the protector 26 about the support member 20 of a sensing passage 19.

Note that the other arrangement of the embodiment 10 is similar to that of the embodiment 7.

In the flow rate sensor 109 arranged as described above, since the protector 26 and the structural member 21F have approximately the same fluid resistance as well as they are disposed symmetrically about the sensing passage 19, it has the following effect, in addition to the effect of the embodiment 7. That is, a fluid resistance is made uniform on the right and left sides of the sensing passage 19. Thus, even if differentia of the distribution of flow velocity of the fluid to be measured, which flows into the main passage 16, is caused, the component of flow velocity in a main flow axis direction is corrected at least in a right to left direction and the distribution of flow velocity of the fluid to be measured is averaged in the main flow axis direction because the fluid resistance is made uniform on the right and left sides of the sensing passage 19. Therefore, an error is difficult to arise in a sensed flow and a flow rate can be correctly sensed.

Embodiment 11

Figure 22:
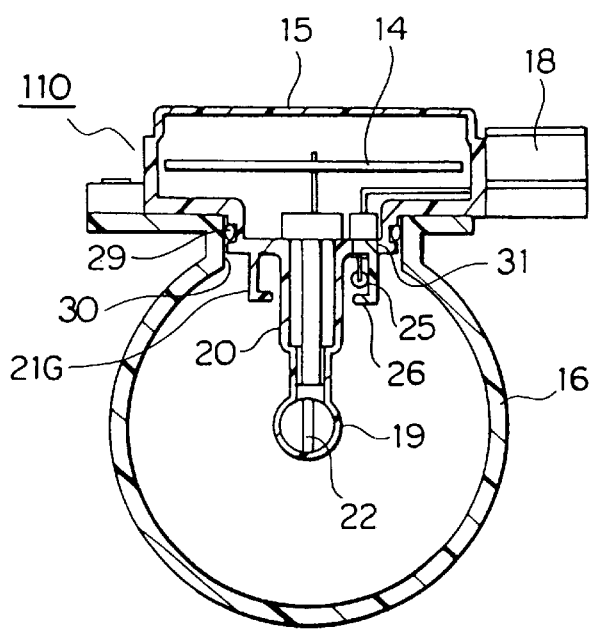
FIG. 22 is a partial lateral sectional view showing a flow rate sensor according to an embodiment 11 of the present invention.

FIG. 22 is a partial lateral sectional view showing a flow rate sensor according to an embodiment 10 of the present invention.

As shown in FIG. 22, in the embodiment 11, a structural member 21G having a shape similar to that of the protector 26 is disposed at a position approximately symmetrical with the protector 26 about the support member 20 of a sensing passage 19.

Note that the other arrangement of the embodiment 11 is similar to that of the embodiment 8.

In the flow rate sensor 110 arranged as described above, since the protector 26 and the structural member 21G have approximately the same fluid resistance as well as they are disposed symmetrically about the sensing passage 19, it has the following effect, in addition to the effect of the embodiment 8. That is, a fluid resistance is made uniform on the right and left sides of the sensing passage 19. Thus, even if differentia of the distribution of flow velocity of the fluid to be measured, which flows into the main passage 16, is caused, the component of flow velocity in a main flow axis direction is corrected at least in a right to left direction and the distribution of flow velocity of the fluid to be measured is averaged in the main flow axis direction because the fluid resistance is made uniform on the right and left sides of the sensing passage 19. Therefore, an error is difficult to arise in a sensed flow and a flow rate can be correctly sensed.

Embodiment 12

Figure 23:
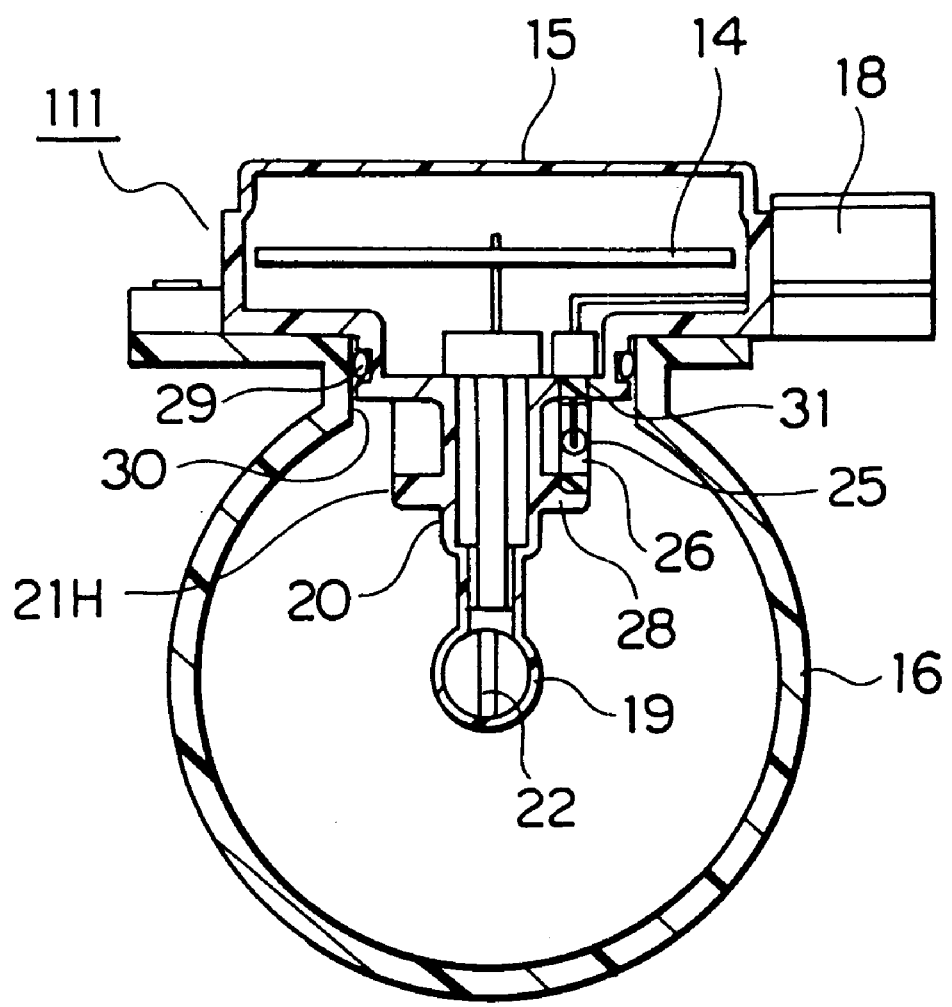
FIG. 23 is a partial lateral sectional view showing a flow rate sensor according to an embodiment 12 of the present invention.
Figure 24:
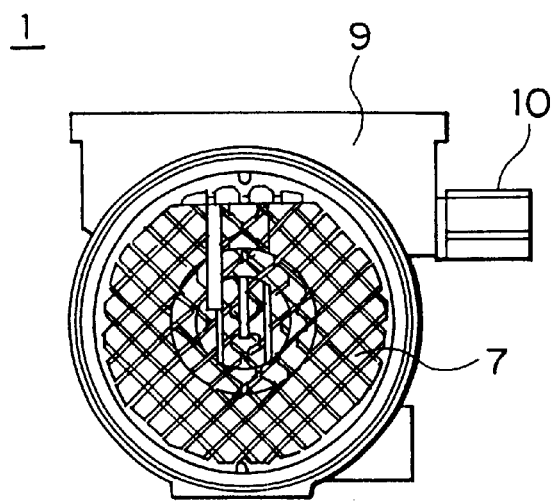
FIG. 24 is a front elevational view showing a conventional flow rate sensor.
Figure 25:
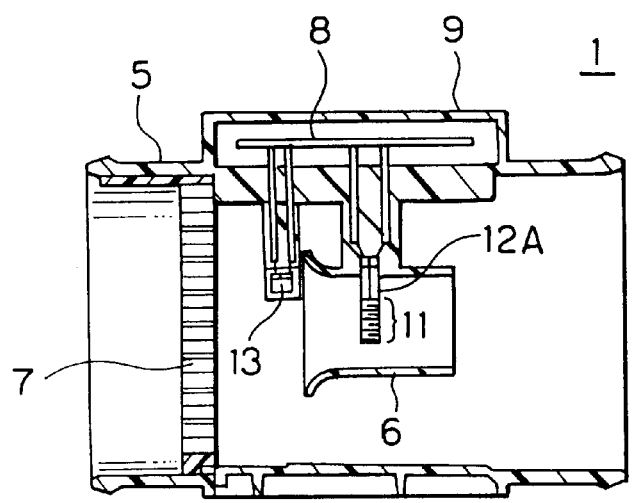
FIG. 25 is a longitudinal sectional view showing the conventional flow rate sensor.
Figure 26:
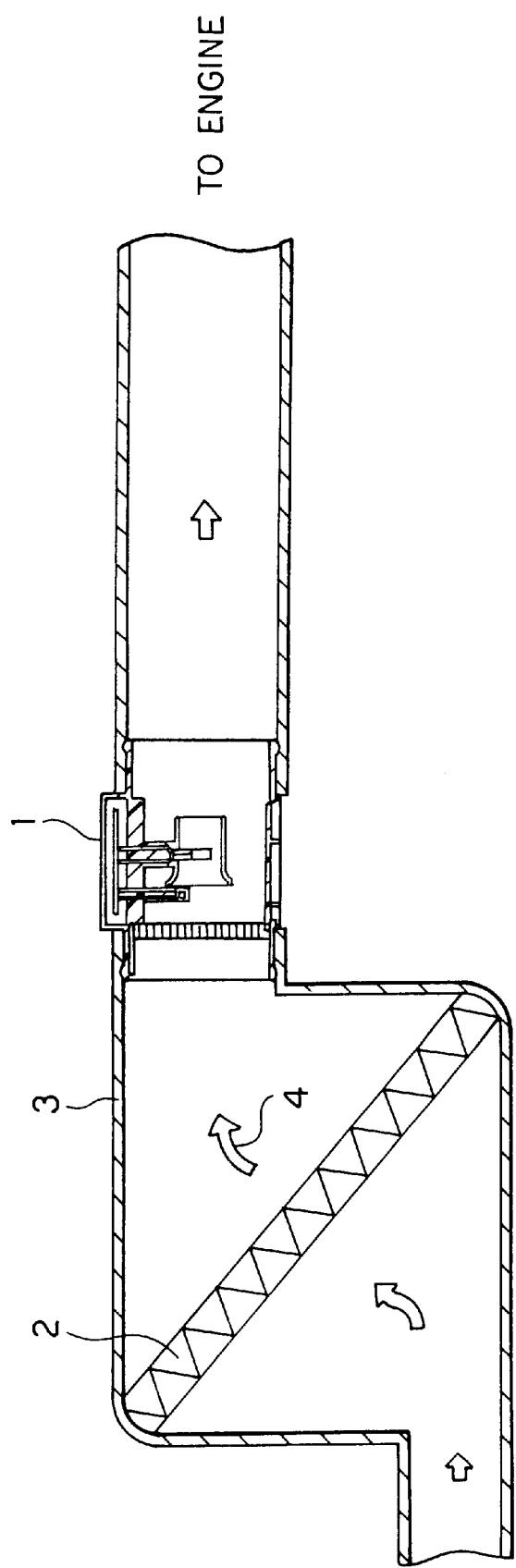
FIG. 26 is a view of the piping of an intake air system of an internal combustion engine for automobile to which the conventional flow rate sensor is applied.

FIG. 23 is a partial lateral sectional view showing a flow rate sensor according to an embodiment 10 of the present invention.

As shown in FIG. 23, in the embodiment 12, a structural member 21H having a shape similar to that of the protector 26 and the structural body 28 is disposed at a position approximately symmetrical with the protector 26 and the structural body 28 about the support member 20 of a sensing passage 19.

Note that the other arrangement of the embodiment 12 is similar to that of the embodiment 9.

In the flow rate sensor 111 arranged as described above, since the structural member 21H and, the protector 26 and the structural body 28 have approximately the same fluid resistance as well as they are disposed symmetrically about the sensing passage 19, it has the following effect, in addition to the effect of the embodiment 9. That is, a fluid resistance is made uniform on the right and left sides of the sensing passage 19. Thus, even if differentia of the distribution of flow velocity of the fluid to be measured, which flows into the main passage 16, is caused, the component of flow velocity in a main flow axis direction is corrected at least in a right to left direction and the distribution of flow velocity of the fluid to be measured is averaged in the main flow axis direction because the fluid resistance is made uniform on the right and left sides of the sensing passage 19. Therefore, an error is difficult to arise in a sensed flow and a flow rate can be correctly sensed.

Since the present invention is arranged as described above, it can achieve the following effects.

According to the present invention, in the flow rate sensor comprising the flow rate sensing element for sensing the flow rate of a fluid, a sensing passage into which the fluid is introduced and in which the flow rate sensing element is disposed, the support member for supporting the sensing passage and the circuit case in which the electronic circuit unit for controlling the flow rate sensing element is accommodated, wherein the sensing passage, the support member and the circuit case are formed integrally with each other and the support member extends into the main passage, through which the fluid flows, through the hole opened to the main passage so as to position the sensing passage in the main passage, the flow rate sensor further comprises the structural member whose the outside shape is formed to have a fluid resistance approximately similar to that of the portion of the support member extending from the hole, wherein the structural member is disposed at the position approximately symmetrical with the portion of the support member extending from the hole about the sensing passage. Accordingly, there can be obtained the flow rate sensor capable of sensing the flow rate of the fluid to be measured at a pinpoint accuracy even if the distribution of flow velocity of the fluid varies.

Since the structural member is formed by extracting the predetermined solid portion from the interior thereof, the cost and weight of the flow rate sensor can be reduced.

Since at least a portion of the structural member is formed as a component separated from the sensing passage and fixed to the sensing passage or to the mounting section disposed in the sensing passage by the fixing means, the flow rate sensor is suitable as an intake air flow rate sensor of an internal combustion engine for automobile having a different displacement.

In the flow rate sensor comprising the flow rate sensing element for sensing the flow rate of a fluid, the sensing passage into which the fluid is introduced and in which the flow rate sensing element is disposed, the support member for supporting the sensing passage, the circuit case in which the electronic circuit unit for controlling the flow rate sensing element is accommodated and the fluid temperature sensing element for sensing the temperature of the fluid, wherein the sensing passage, the support member and the circuit case is formed integrally with each other and the support member extends into the main passage, through which the fluid flows, through the hole opened to the main passage so as to position the sensing passage and the fluid temperature sensing element in the main passage, the flow rate sensor further comprises the protector for protecting the fluid temperature sensing element, and the structural member whose the outside shape is formed to have a fluid resistance approximately similar to that of the protector, wherein the protector and the structural member are disposed at the positions approximately symmetrical with respect to the support member for supporting the sensing passage. Accordingly, there can be obtained the flow rate sensor capable of sensing the flow rate of the fluid to be measured at a pinpoint accuracy even if the distribution of flow velocity of the fluid vanes.

Since the fluid temperature sensing element is formed integrally with the sensing passage, the support member and the circuit case, positional dislocation is difficult to be arisen in the assembly of the fluid temperature sensing element.

Since the fluid temperature sensing element and the protector are formed integrally with each other as a unit and a hole, into which the unit is inserted, is opened to the support member or to the circuit case, there can be obtained the flow rate sensor whose yield can be improved and whose manufacturing cost can be reduced.

Further, since a structural body for supporting the unit is formed integrally with the support member, positional dispersion can be reduced when parts are assembled, whereby the dispersion of flow characteristics can be decreased.

In the flow rate sensor comprising a flow rate sensing element for sensing the flow rate of a fluid, the sensing passage into which the fluid is introduced and in which the flow rate sensing element is disposed, the support member for supporting the sensing passage, the sensing assistant member disposed so as to extend into the sensing passage for supporting the flow rate sensing element and the circuit case in which the electronic circuit unit for controlling the flow rate sensing element is accommodated, the flow rate sensor further comprises the protective member disposed so as to project into the sensing passage for protecting the electric junction, at which the electronic circuit unit is connected to the flow rate sensing element, from the fluid in cooperation with the sensing assistant member, and the structural member whose the outside shape is formed to have a fluid resistance approximately similar to that of the portion of the protective member projecting into the sensing passage, the structural member being located at the position approximately symmetrical with the portion of the protective member projecting into the sensing passage about the axial center of the sensing passage. Accordingly, there can be obtained the flow rate sensor capable of sensing the flow rate of the fluid to be measured at a pinpoint accuracy even if the distribution of flow velocity of the fluid varies.

Since the structural member is formed integrally with the sensing assistant member, the dispersion of the flow characteristics of the flow rate sensor can be reduced.

In the flow rate sensor comprising the flow rate sensing element for sensing the flow rate of a fluid, the sensing passage into which the fluid is introduced and in which the flow rate sensing element is disposed, the support member for supporting the sensing passage, the circuit case in which the electronic circuit unit for controlling the flow rate sensing element is accommodated, the fluid temperature sensing element for sensing the temperature of the fluid and the protector for protecting the fluid temperature sensing element, the sensing passage, the support member and the circuit case being formed integrally with each other and the support member extending into the main passage, through which the fluid flows, through the hole opened to the main passage so as to position the sensing passage in the main passage, wherein the fluid temperature sensing element and the protector are formed integrally with each other as the unit and the hole, into which the unit is inserted, is opened to the support member or to the circuit case. Accordingly, there can be obtained the flow rate sensor whose yield can be improved and whose manufacturing cost can be reduced.

Further, since the structural member for supporting the unit is formed integrally with the support member, positional dispersion can be reduced when parts are assembled, whereby the dispersion of flow characteristics can be decreased.

What is claimed is:

1. A flow rate sensor comprising a flow rate sensing element for sensing the flow rate of a fluid, a sensing passage into which the fluid is introduced and in which the flow rate sensing element is disposed, a support member for supporting the sensing passage and a circuit case in which an electronic circuit unit for controlling the flow rate sensing element is accommodated, wherein the sensing passage, the support member and the circuit case are formed integrally with each other and the support member extends into a main passage, through which the fluid flows, through a hole opened to the main passage so as to position the sensing passage in the main passage, the flow rate sensor comprising:

a structural member having an outside shape is formed to have a fluid resistance approximately similar to that of the portion of the support member extending from the hole, wherein said structural member is disposed at a position approximately symmetrical with the portion of the support member extending from the hole about the sensing passage.

2. A flow rate sensor according to claim 1, wherein a predetermined solid portion is being removed from an interior of said structural member.

3. A flow rate sensor according to claim 1, wherein at least a portion of said structural member is formed as a component separated from the sensing passage and fixed to the sensing passage or to a mounting section disposed in the sensing passage by a fixing means.

* * * * *